Aug. 12, 1952　　　　K. B. GLENN　　　　2,606,422
HYDRAULIC TRANSMISSION WITH AXIALLY SHIFTABLE SPEED
VARYING CONTROL MEANS BETWEEN PUMP AND MOTOR ROTORS
Filed Jan. 31, 1947　　　　　　　　　　　　5 Sheets-Sheet 1

INVENTOR
Kenneth B. Glenn

Aug. 12, 1952　　K. B. GLENN　　2,606,422
HYDRAULIC TRANSMISSION WITH AXIALLY SHIFTABLE SPEED
VARYING CONTROL MEANS BETWEEN PUMP AND MOTOR ROTORS
Filed Jan. 31, 1947　　5 Sheets-Sheet 4

INVENTOR
Kenneth B. Glenn
by his attorneys

Aug. 12, 1952     K. B. GLENN     2,606,422
HYDRAULIC TRANSMISSION WITH AXIALLY SHIFTABLE SPEED
VARYING CONTROL MEANS BETWEEN PUMP AND MOTOR ROTORS
Filed Jan. 31, 1947     5 Sheets-Sheet 5

INVENTOR
Kenneth B. Glenn
by his attorneys

Patented Aug. 12, 1952

2,606,422

UNITED STATES PATENT OFFICE 2,606,422

HYDRAULIC TRANSMISSION WITH AXIALLY SHIFTABLE SPEED VARYING CONTROL MEANS BETWEEN PUMP AND MOTOR ROTORS

Kenneth B. Glenn, New Brighton, Pa., assignor to The Glenn Hydraulic Manufacturing Company, New Brighton, Pa., a corporation of Pennsylvania Application January 31, 1947, Serial No. 725,570

18 Claims. (Cl. 60—53)

1

This invention relates to a variable speed hydraulic transmission such as may be interposed between a prime mover or other source of power and a driven element whereby the power applied may be so adjusted as to compensate for variations in the load. The transmission may be employed in various power operated mechanisms, as, for example, industrial machines, automotive vehicles, etc.

While my invention is broadly applicable, it is especially well adapted for use in industrial machines such as those driven by a constant speed driving means such as a constant speed electric motor and in which a machine speed varying from a speed less than the speed of the driving means to a speed greater than the speed of the driving means is desired in operation. My transmission provides for an infinite number of ratios between the speed of the driving means and the speed of the machine being driven and has provision for maintaining continuously for any desired period any such ratio.

I provide a hydraulic transmission comprising driving and driven shafts aligned and journaled within a housing, the driving shaft having mounted thereon a pair of annularly recessed and retractibly bladed rotors with a slidable stator therebetween. One of the rotors is fixed to the driving shaft and rotates therewith, that rotor acting as the driving or pumping rotor, and the other rotor is free to rotate about the driving shaft but fixed to the driven shaft and acts as the driven rotor. The stator is adapted to vary the ratio of the volume of the annular recesses within the driving rotor to the volume of the annular recesses within the driven rotor, thus controlling the power-speed ratio, and has means for causing retraction of the rotor blades. Mounted within the stator is a valve and duct assembly for controlling the direction of flow of hydraulic fluid by means of which reversal of direction of the driven rotor may be accomplished.

My hydraulic transmission may comprise three cooperating elements mounted upon the driving shaft; namely, the driving rotor, which is fixed to the driving shaft, the driven rotor, which is free to rotate about the driving shaft, and the stator, which does not rotate and which is positioned between the two rotors for movement parallel to the axis of the driving shaft. The stator acts as a reaction member and preferably is adapted to sleeve into the respective rotors. The driven rotor may be held in working position as by a roller thrust bearing and lock nut on the end of the driving shaft. The driven shaft may sleeve over the means holding the driven rotor in working position and be fixed to the driven rotor. A complete in-line assembly is thus formed may be mounted in a housing which may also serve as a reservoir for hydraulic fluid. The use of the housing as a reservoir eliminates the need of high pressure sealing for the shafts as all leakage from the assembly escapes back into the reservoir, which is under low gravity pressure.

The stator acts as a reaction member and may serve as the control means for the transmission. Sleeving of the stator into the driving rotor and out of the driven rotor or vice versa inversely varies their respective displacements so that when the stator is moved so as to closely approach the driving rotor the displacement of the driven rotor approaches maximum and the transmission provides maximum starting torque. When the stator is moved so as to closely approach the driven rotor the displacement of the driving rotor approaches maximum and the transmission provides for high speed high efficiency operation.

A valve-and-seat assembly may be slidably mounted within the stator between the rotors. The seat or valve block may contain ducts or passages for hydraulic fluid and the valve may act as a reversing valve to reverse the direction of flow of hydraulic fluid. The valve may be manually operable to control the flow of hydraulic fluid so as to determine the direction of rotation of the driven rotor without change in the direction of rotation of the driving rotor. The valve block carries spring ramps which act to guide the rotor blades and cause their extension into and retraction from the annular recesses during operation.

Other details, objects and advantages of the invention will become apparent as the following description of a present preferred embodiment thereof proceeds.

In the accompanying drawings I have shown a present preferred embodiment of the invention, in which.

The transmission shown in the drawings comprises a housing 2 of generally cylindrical shape having adjacent its respective ends coaxial bearings 3 and 4, respectively. A driving shaft 5 is journaled in the bearing 3 and projects out of the housing toward the left viewing Figure 2. A driven shaft 6 is journaled in the bearing 4 and projects out of the housing toward the right viewing the same figure. Mounted on the driving shaft 5 are a driving rotor 7, a stator or reaction member 8 and a driven rotor 9. The stator 8 and the driven rotor 9 are freely mounted upon the shaft 5 so that they may rotate relatively thereto. The stator 8 is held in working position by a pair of links 10 and a cam shaft 11, and the rotor 9 is held in working position by a thrust bearing 12 and a lock nut 13 on the driving shaft. The driving rotor 7 is fixed to the driving shaft 5 by being screwed by cap screws 14 to a radial flange 14a integral with the shaft.

Figure 8:
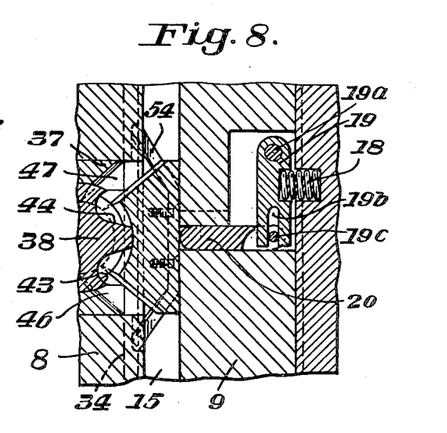
Figure 8 is a fragmentary cross-sectional view through a portion of the valve and blade structure taken on the line VIII—VIII of Figure 2.

The rotor 7 has an annular recess 15 defining a chamber for hydraulic fluid and a series of recesses 17, each communicating with the annular recess 15 and extending therefrom in a direction parallel to the axis of the rotor. There is provided a series of pumping or driving blades 16, one of which is seated in each of the recesses 17. Each blade 16 is adapted to be urged toward the annular recess 15 by a lever 19 pivoted to the rotor at 19a and yieldably pressed against the blade by a compression coil spring 18, the lever 19 having a slot 19b receiving a pin 19c projecting from the blade. The means for biasing the blades is the same in both of the rotors 7 and 9. Such means in the rotor 9 is shown in Figure 8.

The driven rotor 9 is like the driving rotor 7 but is reversed in position so that the recesses 15 of the respective rotors face each other. The blades 20 of the driven rotor are, however, of greater effective area than the blades 16 of the driving rotor. The driven shaft 6 has an extremity 6a journaled in the bearing 4, an adjacent portion 6b of increased diameter and a sleeve portion 6c extending toward the rotor 9 or toward the left, viewing Figure 2. The sleeve portion 6c of the driven shaft 6 is connected with the driven rotor 9 by cap screws 24 so that the driven shaft 6 is in effect integral with the driven rotor 9. Mounted in the portion 6b of the driven shaft 6 is a bearing 22 receiving the right hand extremity, viewing Figure 2, of the driving shaft 5, such shaft extremity being journaled in the bearing 22. Thus the driven shaft 6 assists in positioning and journaling the driving shaft 5 while relative rotation between the two shafts is provided for. The sleeve portion 6c of the driven shaft 6 has therethrough an annular series of ports 23 through which hydraulic fluid is admitted from the space within the housing 2 but outside the sleeve portion 6c into the space within the sleeve portion 6c.

Figure 2:
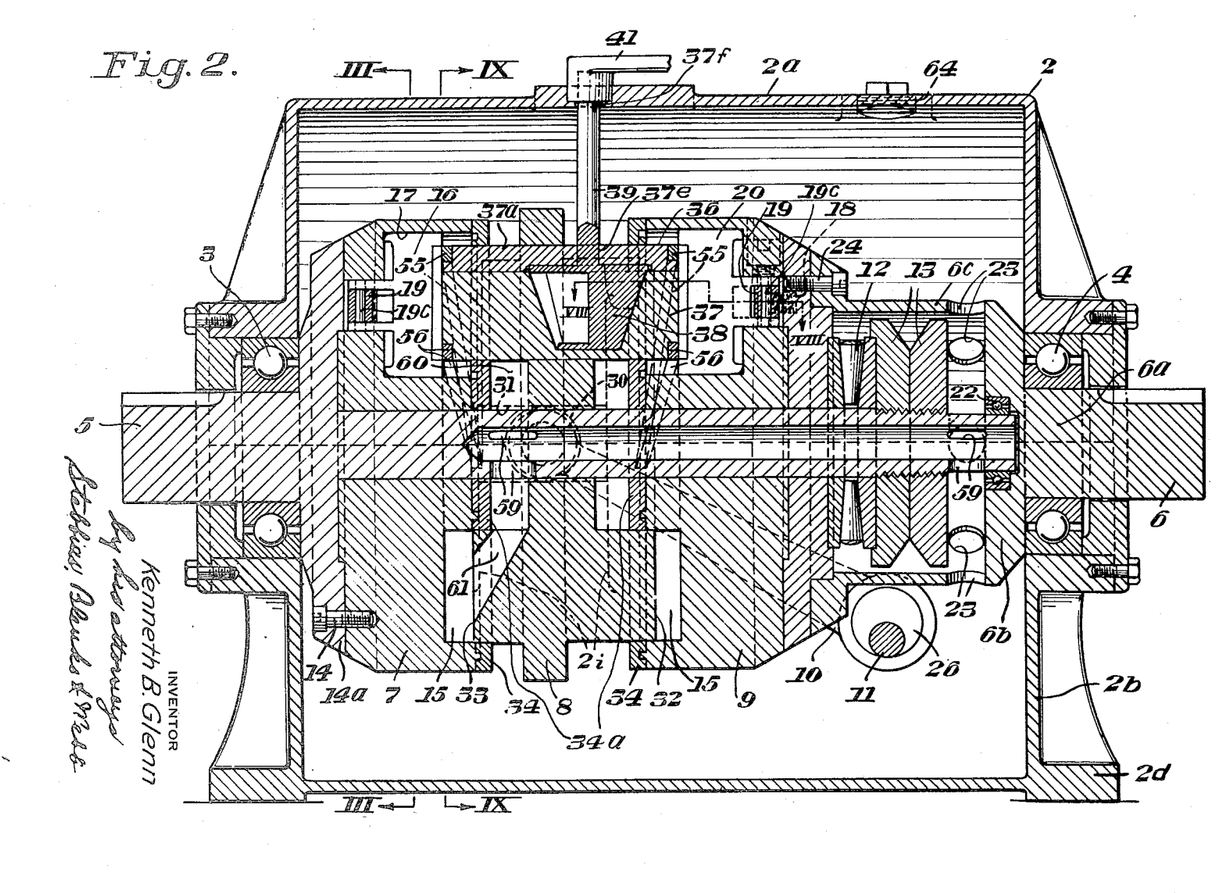
Figure 2 is a central vertical longitudinal cross-sectional view to enlarged scale of the transmission.
Figure 3:
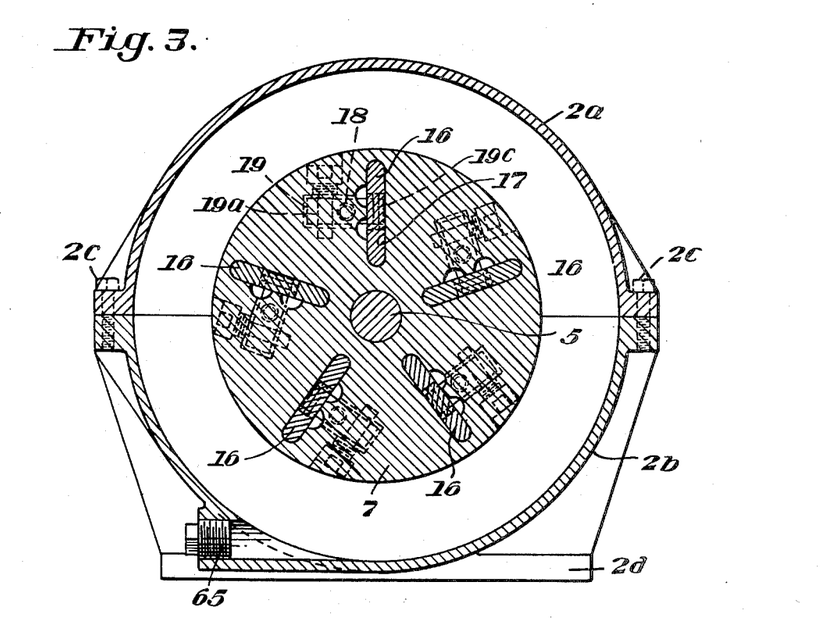
Figure 3 is a vertical transverse cross-sectional view taken on the line III—III of Figure 2.
Figure 4:
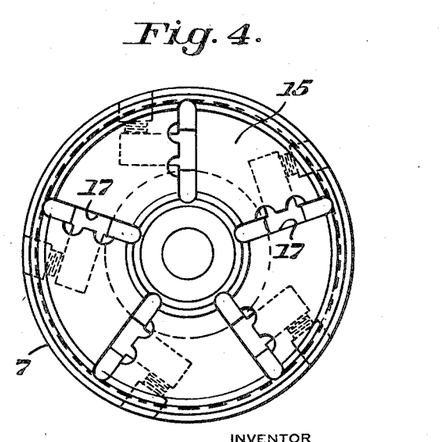
Figure 4 is a face view of the driving rotor.
Figure 5:
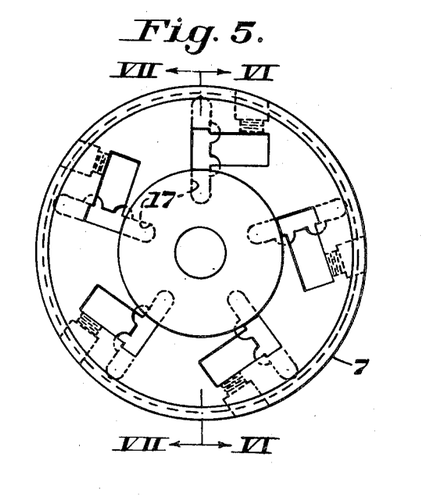
Figure 5 is a face view of the driven rotor.
Figure 6:
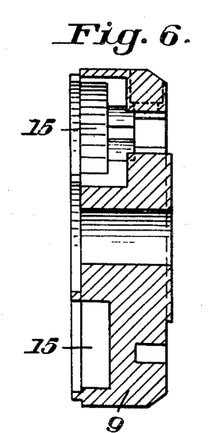
Figure 6 is an axial cross-sectional view of the driven rotor taken on the line VI—VI of Figure 5.
Figure 7:
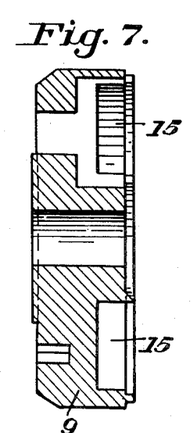
Figure 7 is an axial cross-sectional view of the driven rotor taken on the line VII—VII of Figure 5.

The stator 8 is the principal control member of the hydraulic transmission. It is mounted for axial sliding movement along the shaft 5 but is not free to rotate. It is shown in Figure 2 in neutral position. Axial movement of the stator determines the areas of the respective blades 16 and 20 which project into the respective annular recesses 15. The stator also contains the passages or ducts and the valve controlling the flow of hydraulic fluid so that the driven rotor may be driven in either direction of rotation relatively to the direction of rotation of the driving rotor.

The housing 2 comprises an upper half 2a and a lower half 2b fastened together by cap screws 2c. The lower half 2b of the housing is shaped at 2d to form a base for mounting of the transmission. The upper half 2a of the housing has opposed inwardly projecting bosses 2e at the lower extremities of its curved side walls and the lower half 2b of the housing has opposed inwardly projecting bosses 2f at the upper extremities of its curved side walls. Each of the bosses 2e is notched at 2g at its inner lower edge and each of the bosses 2f is notched at 2h at its inner upper edge. The bosses 2e and 2f extend for only a short distance axially of the housing, the respective ends of the bosses being indicated by the dotted lines 2i in Figure 2.

When the upper half 2a and the lower half 2b of the housing 2 are assembled the notches 2g and 2h at the respective sides of the interior of the housing cooperate to form opposed straight parallel inwardly open guide slots 31 respectively receiving rollers 30 mounted for rotation on reduced extremities 25a of coaxial trunnions 25 integral with the stator 8. Thus the stator is guided for limited movement axially of the housing.

Figure 1:
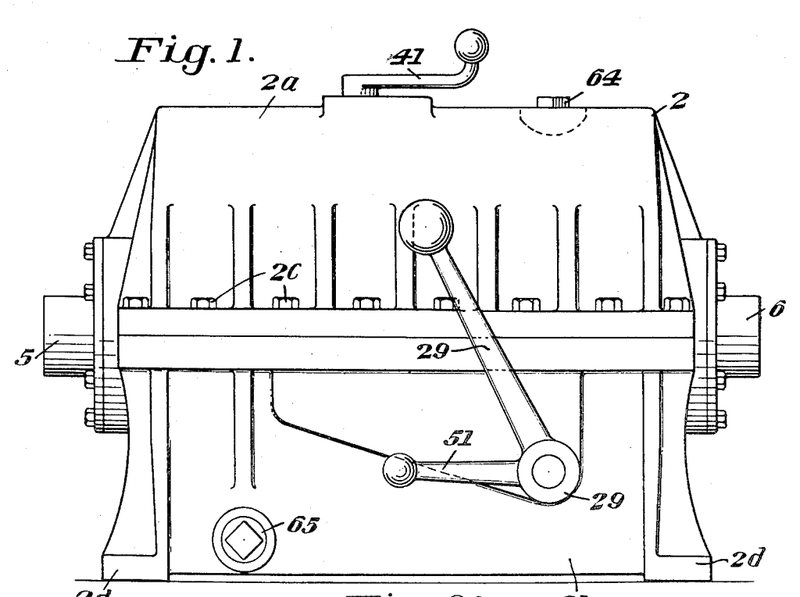
Figure 1 is a side elevation of a hydraulic transmission looking at the outside of the housing.

Journaled in the lower half 2b of the housing is a cam shaft 11. The cam shaft extends transversely of the housing, one end 27 thereof being journaled in a plug 27a screwed into the housing and the opposite end 28 being journaled in a plug 28a screwed into the housing and extending therethrough and having a reduced outer extremity 29a to which is applied a lever 29 which is fixed to the extremity 29a by a pin 29b. Immediately inside the plug 28a the shaft 11 has an enlargement 28b, and immediately outside the plug 28a the shaft has a threaded portion 28c on which is threaded a nut 21 cooperating with the enlargement 28b to hold the shaft against substantial axial displacement. The nut 21 also acts as a jam nut, being provided with a lever 51 projecting laterally therefrom. When the lever 51 is moved upwardly or in the clockwise direction about the axis of the shaft 11, viewing Figure 1, it tightens the nut 21 against the outer surface of the plug 28a and thus by friction holds the shaft 11 in fixed rotative position.

Adjacent the opposite housing walls the shaft 11 has eccentrics 26 which are similarly positioned on the shaft, and each of the opposed links 10 is at one of its ends journaled upon one of the eccentrics. Each link 10 is at its opposite end journaled on one of the trunnions 25.

When the jam nut 21 is tightened against the outer surface of the plug 28a the shaft 11 is held against rotation and the stator 8 is maintained in desired fixed position axially of the shaft 5. When it is desired to move the stator axially of the shaft 5 the jam nut is loosened by moving the lever 51 downwardly or in the counterclockwise direction about the axis of the shaft 11, viewing Figure 1, to free the shaft for rotation, whereupon the shaft is turned by grasping the lever 29 and swinging it in desired direction about the axis of the shaft. Turning of the shaft 11 causes, through the eccentrics 26 and the links 10, movement of the stator 8 axially of the casing, the stator being guided in such movement by the rollers 30 operating in the guide slots 31.

Each of the faces of the stator 8 cooperating with one of the rotors 7 and 9 has an annular axial projection entering the annular recess of the corresponding rotor to form an annular fluid confining channel. The stator has an annular axial projection 33 entering the recess 16 of the rotor 7 and an annular axial projection 32 entering the recess 15 of the rotor 9. Each of the rotors has on its face nearest the stator an outer sealing ring 34 and an inner sealing ring 34a to prevent the escape of hydraulic fluid along the sides of the annular axial projections of the stator, the inner sealing ring 34a also sealing against the shaft 5.

The stator 8 is provided with a notch 35 in its upper surface, the length of the notch being parallel to the axis of the shaft 5. The notch is relatively narrow at its bottom and relatively wide at its top, the bottom of the notch being defined by a surface which is part of the surface of a cylinder coaxial with the shaft 5. Positioned in the notch 35 is a valve assembly 36. The valve assembly 36 comprises a valve block 37, a cover 37a and a valve proper 38. The bottom of the valve block 37 is curved to conform to the curvature of the bottom of the notch 35. The top of the cover 37a is curved so as to form a portion of the surface of a larger cylinder coaxial with the shaft 5. The top of the valve block 37 has longitudinal corner notches 37b and the bottom of the cover 37a has projections entering the notches 37b whereby the cover is accurately positioned with respect to the valve block. The cover is held in place on the block by screws 37c.

The length of the valve assembly 36 in the axial direction is substantially equal to the axial distance between the bottom of the annular recess 15 in the rotor 7 and the bottom of the annular recess 15 in the rotor 9 so that the valve assembly is by the rotors 7 and 9 at all times maintained in fixed axial position. The stator 8 which guides the valve assembly is itself axially movable as has been explained, so when the stator 8 moves axially the notch 35 which guides the valve assembly 36 slides relatively to the valve assembly.

The valve block 37 is provided with a generally conical socket 37d in which the valve 38 seats, the valve being of generally conical shape and being adapted to turn about its axis, which is vertical and intersects at right angles the axis of the shaft 5. The valve 38 has integral therewith or fixed thereto a stem 39 which is coaxial with the valve and projects upwardly through an opening 37e in the cover 37a and also through an opening 37f in the top of the housing 2, an operating lever 41 being fixed to the projecting end of the stem 39 and positioned outside the housing. By swinging the lever 41 about the axis of the stem 39 the valve 38 may be turned in its socket 37d.

Figures 12, 13, 14, 15, 16, 17, 18, 19, 21:
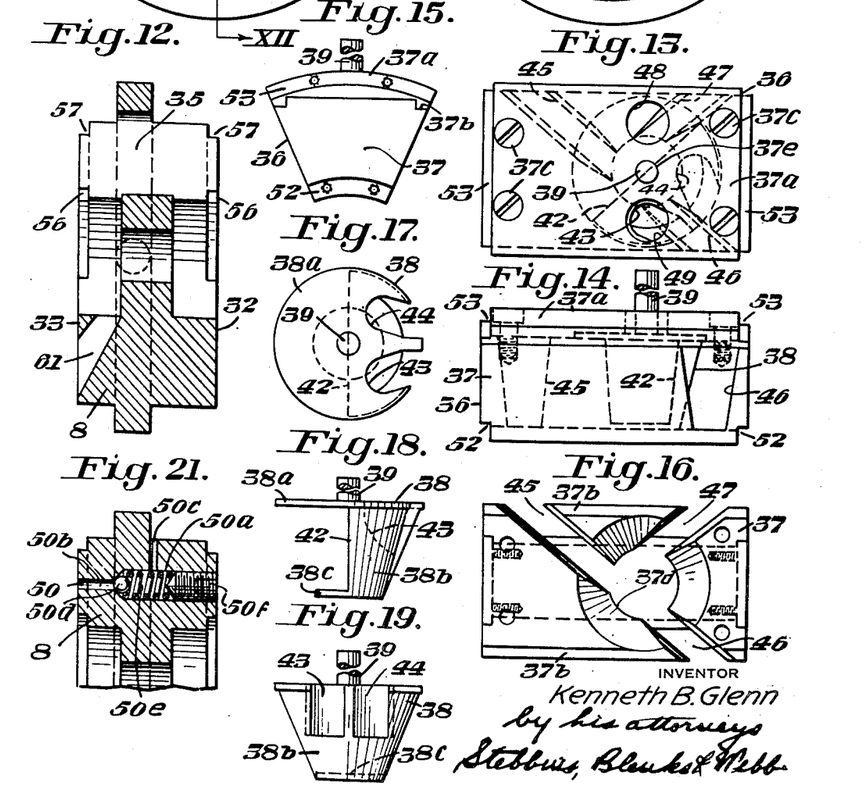
Figure 12 is an axial cross-sectional view of the stator taken on the line XII—XII of Figure 10.
Figure 13 is a top plan view of the valve assembly.
Figure 14 is a side elevational view of the valve assembly.
Figure 15 is an end elevational view of the valve assembly.
Figure 16 is a top plan view of the valve block, the valve and cover being removed.
Figure 17 is a top plan view of the valve.
Figure 18 is an elevational view of the valve as viewed from the bottom of Figure 17.
Figure 19 is an elevational view of the valve as viewed from the right in Figure 17.
Figure 21 is a fragmentary cross-sectional view through the stator taken on the line XXI—XXI of Figure 10 and showing the relief valve.
Figure 20:
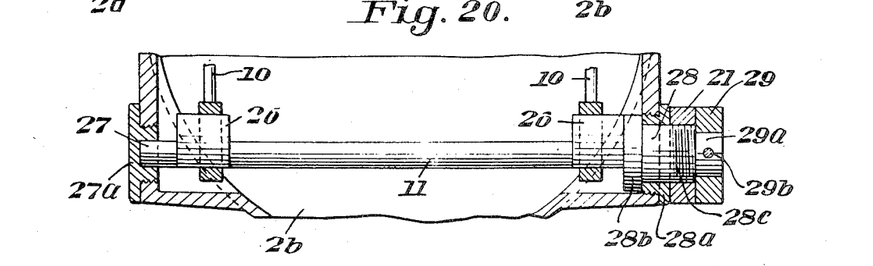
Figure 20 is a fragmentary vertical transverse cross-sectional view through the housing showing the cam shaft and its mounting.

The valve block 37 is provided with three ports 45, 46 and 47. Each of these ports tapers upwardly from relatively narrow width at the bottom to relatively great width at the top as shown in Figures 14 and 16. The port 45 enters the block at its upper face near the left hand end, viewing Figure 16, and extends generally downwardly and toward the right, viewing that figure, so as to intersect the socket 37d. The port 46 is in effect a continuation of the port 45, intersecting the socket 37d and intersecting the lower wall of the block near the right hand end thereof, viewing Figure 16. The port 47 is complementary to the port 46, intersecting the socket 37d at the upper portion thereof, viewing Figure 16, and extending upwardly and to the right and intersecting the upper wall of the block adjacent the right hand end thereof. Each of the ports 45, 46 and 47 also intersects the upper surface of the block 37 and extends downwardly in the block so as to have its bottom spaced only a short distance above the bottom of the block.

As will presently appear, the port 45 is an inlet port through which in operation of the transmission hydraulic fluid enters the block. Depending upon the position of the valve, presently to be described, the hydraulic fluid entering through the port 45 passes out through one of the ports 46 and 47 to the driven rotor 9 and returns from that rotor through the other of those ports.

The cover 37a has therethrough ports 48 and 49 which are simply cylindrically bored holes in the cover each disposed above the socket 37d but at opposite sides thereof. The ports 48 and 49 are exhaust ports for exhausting hydraulic fluid to the space outside the assembly 7—8—9 but within the housing 2. Their relationship with the ports 45, 46 and 47 and with the valve 38 will presently be explained.

The valve 38 has a top plate 38a from which depends a generally semi-frusto conical portion 38b. At the bottom of the portion 38b is a lateral projection 38c of such shape that the bottom of the valve is circular and imperforate. Between the left hand half of the top plate 38a and the projection 38c, viewing Figure 18, is a port 42. Ports 43 and 44 are provided in the half of the valve opposite the port 42, the ports 43 and 44 being formed as wells extending downwardly from the top of the valve and intersecting the conical surface of the valve as shown in Figure 19.

When the valve is turned to a position in which the port 42 therein faces directly the port 45 in the block 37, as shown in Figure 13, hydraulic fluid entering through the port 45 passes through the port 42 in the valve and out of the block through the port 47. It returns to the block through the port 46 and is discharged through the port 43 in the valve and the port 49 in the cover. When the valve is in that position the port 44 in the valve has no function. When the valve is turned to a position in which the port 42 communicates with both of the ports 45 and 46 in the block, i. e., when the valve is turned counterclockwise, viewing Figure 13, through an angle of 90° relatively to the position in which it is shown in that figure, hydraulic fluid entering through the port 45 passes through the port 42 in the valve and out of the block through the port 46. It returns to the block through the port 47 and is discharged through the port 44 in the valve and the port 48 in the cover. When the valve is in that position the port 43 in the valve has no function.

The valve block 37 has arcuate grooves 52 along its bottom end edges receiving the central portions of similar opposed spring ramps 54, the ramps being connected with the block by screws 52a. Each of the ramps 54 is made of spring strip metal and has in plan the shape of slightly more than half of a ring (see Figure 9). The free ends of each of the spring ramps 54 project from the block.

The cover 37a has arcuate grooves 53 along its upper end edges receiving the central portions of similar opposed spring ramps 55, the ramps being connected with the cover by screws 53a. Each of the ramps 55, like the ramps 54, is made of spring strip metal and has in plan the shape of slightly more than half of a ring (see Figure 9). The free ends of each of the spring ramps 55 project from the cover.

Thus at each of its ends the valve assembly 36 carries two spring ramps which are attached to the valve assembly at their respective central portions, the ramps when not deformed lying between a vertical plane containing the end of the valve assembly and another vertical plane parallel to the first mentioned vertical plane spaced therefrom a short distance toward the opposite end of the valve assembly. The two spring ramps at each end of the valve assembly are coaxial since each is formed arcuately about the axis of the shaft 5.

Figure 9:
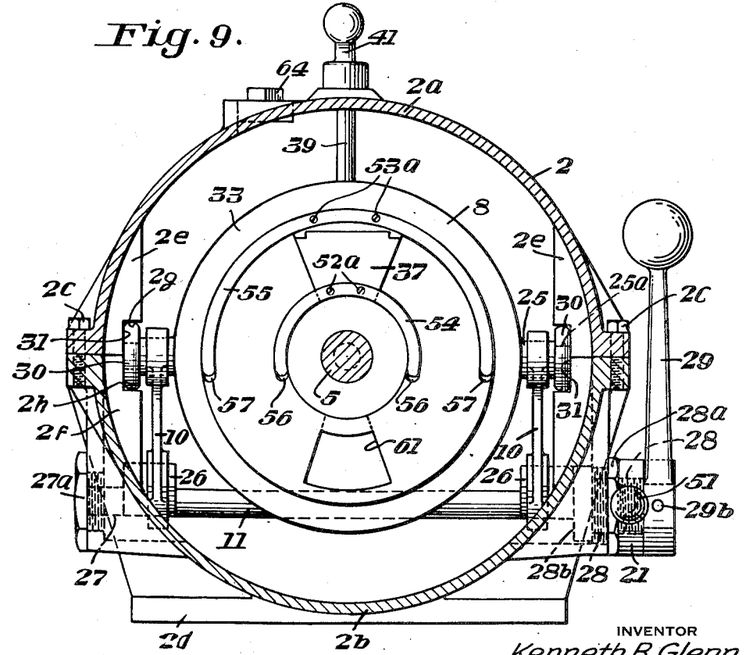
Figure 9 is a vertical transverse cross-sectional view taken on the line IX—IX of Figure 2.
Figure 10:
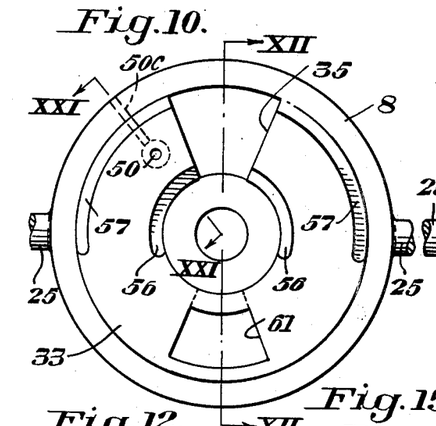
Figure 10 is a face view of the stator as viewed from the driving rotor.
Figure 11:
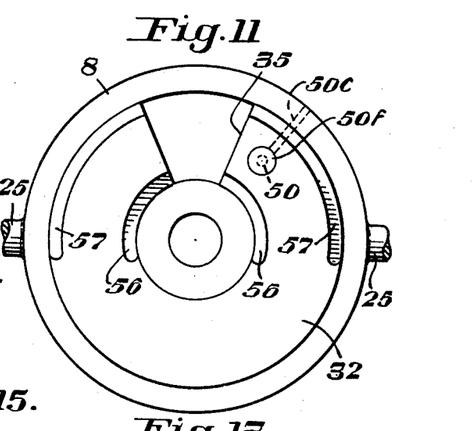
Figure 11 is a face view of the stator as viewed from the driven rotor.

The stator 8 has at each of its faces normal to its axis inner and outer grooves 56 and 57, respectively, of such shape as to be adapted to receive the respective spring ramps 54 and 55 at the corresponding end of the valve assembly (see Figures 9, 10 and 11). The spring ramps are so made out of spring metal that their free ends always resiliently engage the stator, lying within the grooves provided therefor in the stator. It being borne in mind that the valve assembly 36 has no movement and hence that the central portions of the spring ramps have no movement, when the stator moves axially of the shaft 5 the angularity of the projecting ends of the various spring ramps changes. In Figure 2, with the stator in neutral position, all four spring ramps are inclined downwardly and inwardly toward the stator. If the stator be moved toward the right, viewing Figure 2, the spring ramps attached to the right hand end of the valve assembly will tend to straighten out or become planar (in a vertical plane perpendicular to the paper, viewing Figure 2) while the spring ramps attached to the left hand end of the valve assembly will assume a position of greater angularity. The opposite result occurs when the stator is moved toward the left, viewing Figure 2.

The blades 16 and 20 of the respective rotors 7 and 9 are urged by the respective springs 18 toward the stator 8. Considering an individual blade, it engages the stator when opposite the portion of the stator below the free ends of the spring ramps 56 and 57. When the blade is above the free ends of the spring ramps it bears against the spring ramps. At the top of its orbit the outer end of the blade is always in the same position since the central portions of the spring ramps are connected with the fixed valve assembly 36. The extent to which the blades may be projected from the respective rotors when they are not opposite the valve assembly is determined by the axial position of the stator 8. The spring ramps 56 and 57 serve as cams to move the blades parallel to the axis of the shaft 5 as the rotors turn.

Each of the grooves 56 and 57 is somewhat longer in the circumferential direction than the corresponding spring ramp 54 or 55 to allow for changes in the circumferential dimension of the spring ramp due to changes in the angularity of the ends thereof caused by axial movement of the stator and to act as a bleeder to allow fluid pressure to build up behind each blade as it reaches the ramps with which it cooperates. Thus the blade when moving axially has the pressure at both faces substantially balanced so that it may move freely. The blade may have some freedom or play in its containing recess; machining tolerances need not be as close as if the blade were subjected to unbalanced pressures during its axial movement. When the blade is in its static or working phase, and not moving axially, it is subjected to unbalanced pressure which effectively seats and seals it against a face of its containing recess.

Through the stator 8 is a bore 50 having a portion 50a of relatively great diameter and a portion 50b of relatively small diameter. The portion 50b is disposed toward the rotor 7 and the portion 50a is disposed toward the rotor 9. A passage 50c communicates with the portion 50a of the bore 50 and with the space outside the stator but within the housing 2. A ball valve 50d is positioned in the portion 50a of the bore 50 and seats against the shoulder provided at the junction of the portion 50a and the portion 50b, being maintained resiliently against its seat by a compression coil spring 50e biased against a plug 50f threaded into and closing the outer extremity of the portion 50a of the bore. The valve acts as a safety valve, normally closing the portion 50b of the bore 50 but being adapted to relieve pressure within the rotor 7 in the event that the pressure exceeds the pressure resisted by the spring 50e.

The shaft 5 is hollow from its right hand end, viewing Figure 2, to a point opposite the stator 8. Adjacent its right hand end the shaft 5 is slotted at 59 to provide communication between the interior of the shaft and the space within the portion 6c of the shaft 6. As previously described the ports 23 provide communication between the space within the portion 6c of the shaft 6 and the space outside that portion but within the housing 2.

The shaft 5 is slotted at 59' to provide communication between the interior of the shaft and the space 60 between the exterior of the shaft 5 and the inner face of the annular axial projection 33 of the stator. A passage 61 extends from the space 60 to the annular recess 15 in the rotor 7.

The housing 2, as explained above, acts both as a reservoir for the hydraulic fluid and as a casing for the operating means of the hydraulic transmission. The housing is provided with threaded and plugged openings 64 and 65 respectively for the reception and the draining out of hydraulic fluid.

The operation of the hydraulic transmission shown in the drawings and above described will now be described. The housing 2 is filled with hydraulic fluid at least to a level above the top of the portion 6c of the shaft 6. Hydraulic fluid enters the portion 6c of the shaft 6 through the ports 23 and thence through the slot or slots 59 enters the hollow portion of the shaft 5. Hydraulic fluid within the hollow portion of the shaft 5 passes out through the slot or slots 59' into the space 60. Thence it passes through the passage 61 into the annular recess 15 in the driving rotor 7.

The driving shaft 5 is turned by any suitable driving means, as, for example, an internal combustion engine, the direction of turning being clockwise looking from left to right along the shaft, viewing Figure 2. The blades 16 of the driving rotor 7, which are at all times urged toward the stator 8 by the springs 18, follow along the surface of the stator and the spring ramps 54 and 55 on the left hand face of the stator, viewing Figure 2, driving before them the hydraulic fluid entering the annular recess 15 through the passage 61. That hydraulic fluid is forced into the valve block 37 through the port 45. Assuming the valve 38 to be in the position in which it is shown in Figure 13, the hydraulic fluid entering the valve block 37 through the port 45 passes through the port 42 in the valve 38 and thence through the port 47 in the valve block and into the annular recess 15 in the driven rotor 9. That hydraulic fluid acts against the blades 20 of the driven rotor 9, which blades are by their springs 18 urged toward the stator 8. When the hydraulic fluid enters the annular recess 15 of the driven rotor 9 through the port 47 the driven rotor 9 and hence the driven shaft 6 with which it is connected is turned in the counterclockwise direction as viewed from the left hand end of Figure 2. As the driven rotor 9 turns the hydraulic fluid passes back into the valve block 37 through the port 46 and thence through the port 43 in the valve 38 from which it is discharged to the space outside the rotating assembly but within the housing 2 through the discharge port 49.

When the valve 38 is turned through an angle of 90° in the counterclockwise direction, viewing Figure 13, it causes hydraulic fluid entering the valve block 37 through the port 45 to pass through the port 42 in the valve and thence through the port 46 in the valve block into the annular recess 15 in the driven rotor 9, driving the driven rotor and hence the driven shaft 6 in the clockwise direction as viewed from the left hand end of Figure 2.

When it is desired to change the power-speed ratio of the transmission the stator is moved axially of the shaft 5 by the lever 29 and the mechanism associated therewith which has been fully described above. The lever 29 may be operated manually or it may be operated by a pedal, being biased in one direction by a spring and moved in the opposite direction by force exerted by the operator. The lever 51 may likewise be operated manually or by a pedal or any other suitable operating means.

The transmission is completely hydraulic, there being no mechanical coupling between the driving shaft and the driven shaft.

While I have shown and described a present preferred embodiment of the invention it is to be distinctly understood that the invention is not limited thereto but may be otherwise variously embodied within the scope of the following claims.

I claim:

1. In a hydraulic transmission having means for receiving hydraulic fluid and adapted to be driven thereby, a rotor, connections through which the rotor may be rotated, control means including a member movable axially independent of the rotor relatively to which the rotor is adapted to rotate cooperating with the rotor to form an annular channel and having a portion providing a passage for hydraulic fluid delivered from said channel, blade means carried by the rotor adapted to project into said channel for impelling into said passage hydraulic fluid conducted to the rotor upon rotation of the rotor, the blade means being resiliently urged toward the control means, the control means engaging the blade means to cause cyclic advancement thereof into the annular channel and retraction thereof from said channel and cause maximum retraction of the blade means from the annular channel when the blade means are near said passage, the control means except said portion thereof being movable toward and away from the rotor to control the extent of advance of the blade means whereby to control the rate of delivery of hydraulic fluid for a particular speed of rotation of the rotor.

2. In a hydraulic transmission having means for receiving hydraulic fluid and adapted to be driven thereby, a rotor, connections through which the rotor may be rotated, an axially movable stator relatively to which the rotor is adapted to rotate cooperating with the rotor to form an annular channel, delivery means relatively to which the rotor rotates providing a passage for hydraulic fluid delivered from said channel, impelling means carried by the rotor adapted to project into said channel for impelling into said passage hydraulic fluid conducted to the rotor upon rotation of the rotor, the impelling means being resiliently urged toward the stator and delivery means, the stator and delivery means engaging the impelling means to cause cyclic advancement thereof into the annular channel and retraction thereof from said channel and cause maximum retraction of the impelling means from the annular channel when the impelling means are near said passage, the stator being movable toward and away from the rotor to control the extent of advance of the impelling means whereby to control the rate of delivery of hydraulic fluid for a particular speed of rotation of the rotor.

3. In a hydraulic transmission having means for receiving hydraulic fluid and adapted to be driven thereby, a rotor, connections through which the rotor may be rotated, a stator relatively to which the rotor is adapted to rotate cooperating with the rotor to form an annular channel, delivery means relatively to which the rotor is adapted to rotate providing a passage for hydraulic fluid delivered from said channel and extending to a point adjacent the wall of said channel most remote from the stator, impelling means carried by the rotor adapted to project into said channel through said wall for impelling into said passage hydraulic fluid conducted to the channel upon rotation of the rotor, the impelling means being resiliently urged toward the stator and delivery means, cam means connected with one of the stator and delivery means and extending therebetween in all relative positions thereof, the stator, delivery means and cam means engaging the impelling means to cause cyclic advancement thereof into the annular channel and retraction thereof from said channel and cause maximum retraction of the impelling means from the annular channel when the impelling means are near said passage, the stator being movable toward and away from the rotor to control the extent of advance of the impelling means whereby to control the rate of delivery of hydraulic fluid for a particular speed of rotation of the rotor.

4. In a hydraulic transmission having means for receiving hydraulic fluid and adapted to be driven thereby, a rotor, connections through which the rotor may be rotated, control means including a member movable axially independent of the rotor relatively to which the rotor is adapted to rotate cooperating with the rotor to form an annular channel and having a hydraulic fluid inlet through which hydraulic fluid is adapted to be conducted to the channel, delivery means relatively to which the rotor is adapted to rotate projecting into and largely closing the channel at one point therealong, the delivery means providing a passage for hydraulic fluid delivered from the channel, impelling means carried by the rotor adapted to project into and normally substantially fill in cross-section the channel for impelling into the passage hydraulic fluid conducted to the channel through the inlet upon rotation of the rotor, retracting means extending between the delivery means and the control means coacting with the impelling means to cause cyclic retraction of the impelling means from the annular channel to enable the impelling means to pass the delivery means, the axially movable member being movable toward and away from the rotor to control the depth of the channel whereby to control the rate of delivery of hydraulic fluid for a particular speed of rotation of the rotor, the retracting means extending between the delivery means and the control means in all relative positions thereof.

5. In a hydraulic transmission having means for receiving hydraulic fluid and adapted to be driven thereby, a shaft which is adapted to be driven, a rotor fixed to the shaft, control means including a member movable axially independent of the rotor through which the shaft extends but relatively to which the shaft is adapted to rotate cooperating with the rotor to form an annular channel, the shaft being hollow throughout a portion of its length and being adapted to receive hydraulic fluid at a point therealong removed from the control means, the control means having a hydraulic fluid inlet communicating with the interior of the hollow shaft through which hydraulic fluid is adapted to be conducted to the channel, delivery means relatively to which the rotor is adapted to rotate projecting into and largely closing the channel at one point therealong, the delivery means providing a passage for hydraulic fluid delivered from the channel, impelling means carried by the rotor adapted to project into and normally substantially fill in cross-section the channel for impelling into the passage hydraulic fluid conducted to the channel through the inlet upon rotation of the rotor, retracting means extending between the delivery means and the control means coacting with the impelling means to cause cyclic retraction of the impelling means from the annular channel to enable the impelling means to pass the delivery means, the axially movable member being movable toward and away from the rotor to control the depth of the channel whereby to control the rate of delivery of hydraulic fluid for a particular speed of rotation of the rotor, the retracting means extending between the delivery means and the control means in all relative positions thereof.

6. A hydraulic transmission comprising opposed rotors, connections through which one of the rotors may be rotated, control means including a member movable axially independent of the rotors relatively to which both rotors rotate cooperating with each rotor to form an annular channel, the control means having a hydraulic fluid inlet through which hydraulic fluid is adapted to be conducted to the channel of said one rotor, delivery means relatively to which both rotors rotate projecting into and largely closing the channels at one point along each thereof, the delivery means providing a passage for hydraulic fluid between the respective channels, impelling means carried by said one rotor adapted to project into and normally substantially fill in cross-section the channel thereof for impelling into said passage hydraulic fluid conducted to said channel through the inlet upon rotation of said rotor, reacting means carried by the other rotor adapted to project into and normally substantially fill in cross-section the channel thereof to be acted on by the hydraulic fluid delivered through said passage whereby the second mentioned rotor is rotated and retracting means extending between the delivery means and the control means coacting with the impelling means and the reacting means respectively to cause cyclic retraction of the impelling means and the reacting means from their respective channels to enable them to pass the delivery means.

7. A hydraulic transmission comprising opposed rotors, connections through which one of the rotors may be rotated, control means including an axially movable member relatively to which both rotors rotate cooperating with each rotor to form an annular channel, the control means having a hydraulic fluid inlet through which hydraulic fluid is adapted to be conducted to the channel of said one rotor, delivery means relatively to which both rotors rotate projecting into and largely closing the channels at one point along each thereof, the delivery means providing a passage for hydraulic fluid between the respective channels, impelling means carried by said one rotor adapted to project into and normally substantially fill in cross-section the channel thereof for impelling into said passage hydraulic fluid conducted to said channel through the inlet upon rotation of said rotor, reacting means carried by the other rotor adapted to project into and normally substantially fill in cross-section the channel thereof to be acted on by the hydraulic fluid delivered through said passage whereby the second mentioned rotor is rotated and retracting means extending between the delivery means and the control means coacting with the impelling means and the reacting means respectively to cause cyclic retraction of the impelling means and the reacting means from their respective channels to enable them to pass the delivery means, the axially movable member being movable toward and away from the respective rotors to control the depths of the channels whereby to control the power-speed ratio of the transmission, the retracting means extending between the delivery means and the control means in all relative positions thereof.

8. A hydraulic transmission comprising a shaft which is adapted to be driven, a rotor fixed to the shaft, a second rotor through which the shaft extends but relatively to which the shaft is adapted to rotate, the two rotors opposing each other, control means including an axially movable member relatively to which both rotors rotate cooperating with each rotor to form annular channels, the shaft being hollow throughout a portion of its length and being adapted to receive hydraulic fluid at a point therealong removed from the control means, the control means having a hydraulic fluid inlet communicating with the interior of the hollow shaft through which hydraulic fluid is adapted to be conducted to the channel of the first mentioned rotor, delivery means relatively to which both rotors rotate projecting into and largely closing the channels at one point along each thereof, the delivery means providing a passage for hydraulic fluid between the respective channels, impelling means carried by the first mentioned rotor adapted to project into and normally substantially fill in cross-section the channel thereof for impelling into said passage hydraulic fluid conducted to said channel through the inlet upon rotation of the first mentioned rotor, reacting means carried by the second mentioned rotor adapted to project into and normally substantially fill in cross-section the channel thereof to be acted on by the hydraulic fluid delivered through said passage whereby the second mentioned rotor is rotated and retracting means extending between the delivery means and the control means coacting with the impelling means and the reacting means respectively to cause cyclic retraction of the impelling means and the reacting means from their respective channels to enable them to pass the delivery means, the axially movable member being movable toward and away from the respective rotors to control the depths of the channels whereby to control the power-speed ratio of the transmission, the retracting means extending between the delivery means and the control means in all relative positions thereof.

9. A hydraulic transmission comprising a shaft which is adapted to be driven, a rotor fixed to the shaft, a second rotor through which the shaft extends but relatively to which the shaft is adapted to rotate, the two rotors opposing each other, control means including an axially movable member relatively to which both rotors rotate cooperating with each rotor to form annular channels, the shaft being hollow throughout a portion of its length and being adapted to receive hydraulic fluid at a point therealong removed from the control means, the control means having a hydraulic fluid inlet communicating with the interior of the hollow shaft through which hydraulic fluid is adapted to be conducted to the channel of the first mentioned rotor, delivery means relatively to which both rotors rotate projecting into and largely closing the channels at one point along each thereof, the delivery means providing a passage for hydraulic fluid between the respective channels, said passage having portions respectively adapted to deliver hydraulic fluid to the channel of the second mentioned rotor in such manner as to cause rotation of the second mentioned rotor in its respective directions of rotation, valve means for controlling flow of hydraulic fluid to said portions, impelling means carried by the first mentioned rotor adapted to project into and normally substantially fill in cross-section the channel thereof for impelling into said passage hydraulic fluid conducted to said channel through the inlet upon rotation of the first mentioned rotor, reacting means carried by the second mentioned rotor adapted to project into and normally substantially fill in cross-section the channel thereof to be acted on by the hydraulic fluid delivered through said passage whereby the second mentioned rotor is rotated and retracting means extending between the delivery means and the control means coacting with the impelling means and the reacting means respectively to cause cyclic retraction of the impelling means and the reacting means from their respective channels to enable them to pass the delivery means, the axially movable member being movable toward and away from the respective rotors to control the depths of the channels whereby to control the power-speed ratio of the transmission, the retracting means extending between the delivery means and the control means in all relative positions thereof.

10. In a hydraulic transmission having a housing adapted to contain hydraulic fluid, a driving shaft entering the housing and adapted to be rotated by means outside the housing, a rotor within the housing fixed to the driving shaft, control means including an axially movable member relatively to which the rotor is adapted to rotate cooperating with the rotor to form an annular channel and having a hydraulic fluid inlet through which hydraulic fluid is adapted to be conducted from the interior of the housing to the channel, delivery means relatively to which the rotor is adapted to rotate projecting into and largely closing the channel at one point therealong, the delivery means providing a passage for hydraulic fluid delivered from the channel, impelling means carried by the rotor adapted to project into the channel for impelling hydraulic fluid into said passage upon rotation of the rotor, the control means coacting with the impelling means to cause cyclic retraction of the impelling means from the channel to enable the impelling means to pass the delivery means, the axially movable member being movable toward and away from the rotor to control the depth of the channel whereby to control the rate of delivery of hydraulic fluid for a particular speed of rotation of the rotor, means to which the fluid impelled by the impelling means is conducted and which is adapted to be driven thereby, a discharge passage for the fluid extending from the driven means to the interior of the housing and a shaft driven by the driven means passing out of the housing.

11. In a hydraulic transmission having a housing adapted to contain hydraulic fluid, a driving shaft entering the housing and adapted to be rotated by means outside the housing, a rotor within the housing fixed to the driving shaft, a driven shaft entering the housing, a rotor within the housing fixed to the driven shaft, the driving rotor and the driven rotor being opposed to each other, control means including a member movable axially independent of the rotors relatively to which both rotors rotate cooperating with each rotor to form annular channels and providing a passage for hydraulic fluid between the respective annular channels, impelling means carried by the driving rotor adapted to project into the channel thereof for impelling into said passage hydraulic fluid conducted to the channel of the driving rotor upon rotation of the driving rotor, reacting means carried by the driven rotor adapted to project into the channel thereof to be acted on by the hydraulic fluid delivered through said passage and a discharge passage for the fluid extending from the driven rotor to the interior of the housing.

12. In a hydraulic transmission having a housing adapted to contain hydraulic fluid, a driving shaft entering the housing and adapted to be rotated by means outside the housing, a rotor within the housing fixed to the driving shaft, a driven shaft entering the housing, a rotor within the housing fixed to the driven shaft, the driving rotor and the driven rotor being opposed to each other, control means relatively to which both rotors rotate cooperating with each rotor to form annular channels, delivery means relatively to which both rotors rotate projecting into and largely closing the channels at one point along each thereof, the delivery means providing a passage for hydraulic fluid between the respective channels, impelling means carried by the driving rotor adapted to project into the channel thereof for impelling into said passage hydraulic fluid conducted to the channel of the driving rotor upon rotation of the driving rotor, reacting means carried by the driven rotor adapted to project into the channel thereof to be acted on by the hydraulic fluid delivered through said passage, retracting means extending between the delivery means and the control means coacting with the impelling means and the reacting means respectively to cause cyclic retraction of the impelling means and the reacting means from their respective channels to enable them to pass the delivery means and a discharge passage for the fluid extending from the driven rotor to the interior of the housing.

13. A hydraulic transmission comprising a housing adapted to contain hydraulic fluid, a driving shaft entering the housing and adapted to be rotated by means outside the housing, a rotor within the housing fixed to the driving shaft, a driven shaft entering the housing, a rotor within the housing fixed to the driven shaft, the driving rotor and the driven rotor being opposed to each other, control means including an axially movable member relatively to which both rotors rotate cooperating with each rotor to form annular channels, the control means having a hydraulic fluid inlet through which hydraulic fluid is adapted to be conducted from the interior of the housing to the channel of the driving rotor, delivery means relatively to which both rotors rotate projecting into and largely closing the channels at one point along each thereof, the delivery means providing a passage for hydraulic fluid between the respective channels, impelling means carried by the driving rotor adapted to project into and normally substantially fill in cross-section the channel thereof for impelling into said passage hydraulic fluid conducted to the channel of the driving rotor through the inlet upon rotation of the driving rotor, reacting means carried by the driven rotor adapted to project into and normally substantially fill in cross-section the channel thereof to be acted on by the hydraulic fluid delivered through said passage whereby the driven rotor is rotated, retracting means extending between the delivery means and the control means coacting with the impelling means and the reacting means respectively to cause cyclic retraction of the impelling means and the reacting means from their respective channels to enable them to pass the delivery means, the axially movable member being movable toward and away from the respective rotors to control the depth of the channels whereby to control the power-speed ratio of the transmission, the retracting means extending between the delivery means and the control means in all relative positions thereof, and a discharge passage for the fluid extending from the driven rotor to the interior of the housing.

14. A hydraulic transmission comprising a housing adapted to contain hydraulic fluid, a driving shaft entering the housing and adapted to be rotated by means outside the housing, a rotor within the housing fixed to the driving shaft, the driving shaft being hollow throughout a portion of its length and being adapted to receive hydraulic fluid from the interior of the housing at a point along the driving shaft removed from the rotor, a driven shaft entering the housing, a rotor within the housing fixed to the driven shaft, the driving rotor and the driven rotor being opposed to each other, control means including an axially movable member relatively to which both rotors rotate cooperating with each rotor to form annular channels, the control means having a hydraulic fluid inlet communicating with the interior of the driving shaft through which hydraulic fluid is adapted to be conducted from the interior of the housing to the channel of the driving rotor, delivery means relatively to which both rotors rotate projecting into and largely closing the channels at one point along each thereof, the delivery means providing a passage for hydraulic fluid between the respective channels, impelling means carried by the driving rotor adapted to project into and normally substantially fill in cross-section the channel thereof for impelling into said passage hydraulic fluid conducted to the channel of the driving rotor through the inlet upon rotation of the driving rotor, reacting means carried by the driven rotor adapted to project into and normally substantially fill in cross-section the channel thereof to be acted on by the hydraulic fluid delivered through said passage whereby the driven rotor is rotated, retracting means extending between the delivery means and the control means coacting with the impelling means and the reacting means respectively to cause cyclic retraction of the impelling means and the reacting means from their respective channels to enable them to pass the delivery means, the axially movable member being movable toward and away from the respective rotors to control the depths of the channels whereby to control the power-speed ratio of the transmission, the retracting means extending between the delivery means and the control means in all relative positions thereof, a discharge passage for the fluid extending from the driven rotor to the interior of the housing, the driven shaft having a hollow inner end portion receiving the inner end of the driving shaft, and a bearing mounted within the driven shaft in which the inner end of the driving shaft is journaled, the hollow inner end portion of the driven shaft having passage means therethrough and the hollow portion of the driving shaft having passage means therethrough communicating with said first mentioned passage means so that fluid from the interior of the housing passes through said first mentioned passage means and said second mentioned passage means to enter the hollow portion of the driving shaft.

15. A hydraulic transmission comprising a housing adapted to contain hydraulic fluid, a driving shaft entering the housing and adapted to be rotated by means outside the housing, a rotor within the housing fixed to the driving shaft, a driven shaft entering the housing, a rotor within the housing fixed to the driven shaft, the driving rotor and the driven rotor being opposed to each other, control means relatively to which both rotors rotate cooperating with each rotor to form annular channels, means for conducting hydraulic fluid from the interior of the housing to the channel of the driving rotor, delivery means relatively to which both rotors rotate projecting into and largely closing the channels at one point along each thereof, the delivery means providing a passage for hydraulic fluid between the respective channels, said passage having portions respectively adapted to deliver hydraulic fluid to the channel of the driven rotor in such manner as to cause rotation of the driven rotor in its respective directions of rotation, valve means for controlling flow of hydraulic fluid to said portions, valve operating means connected with the valve means for operating the same and projecting through the housing for operation from without the housing, impelling means carried by the driving rotor adapted to project into and normally substantially fill in cross-section the channel thereof for impelling into said passage hydraulic fluid from the channel of the driving rotor upon rotation of the driving rotor, reacting means carried by the driven rotor adapted to project into and normally substantially fill in cross-section the channel thereof to be acted on by the hydraulic fluid delivered through said passage whereby the driven rotor is rotated and retracting means extending between the delivery means and the control means coacting with the impelling means and the reacting means respectively to cause cyclic retraction of the impelling means and the reacting means from their respective channels to enable them to pass the delivery means.

16. A hydraulic transmission comprising a housing adapted to contain hydraulic fluid, a driving shaft entering the housing and adapted to be rotated by means outside the housing, a rotor within the housing fixed to the driving shaft, a driven shaft entering the housing, a rotor within the housing fixed to the driven shaft, the driving rotor and the driven rotor being opposed to each other, control means including a member movable axially independent of the rotors relatively to which both rotors rotate cooperating with each rotor to form annular channels, means for conducting hydraulic fluid from the interior of the housing to the channel of the driving rotor, delivery means relatively to which both rotors rotate projecting into and largely closing the channels at one point along each thereof, the delivery means providing a passage for hydraulic fluid between the respective channels, impelling means carried by the driving rotor adapted to project into and normally substantially fill in cross-section the channel thereof for impelling into said passage hydraulic fluid from the channel of the driving rotor upon rotation of the driving rotor, reacting means carried by the driven rotor adapted to project into and normally substantially fill in cross-section the channel thereof to be acted on by the hydraulic fluid delivered through said passage whereby the driven rotor is rotated, retracting means extending between the delivery means and the control means coacting with the impelling means and the reacting means respectively to cause cyclic retraction of the impelling means and the reacting means from their respective channels to enable them to pass the delivery means, the axially movable member being shiftable toward and away from the respective rotors to control the depths of the channels whereby to control the power-speed ratio of the transmission, a shifting device having a portion extending through the housing and adapted to be operated from without the housing, connections between the shifting device and the control means for shifting the control means axially movable member toward and away from the respective rotors upon operation of the shifting device and locking means operable from without the housing for locking the shifting device in fixed position.

17. A hydraulic transmission comprising a housing adapted to contain hydraulic fluid, a driving shaft entering the housing and adapted to be rotated by means outside the housing, a rotor within the housing fixed to the driving shaft, a driven shaft entering the housing, a rotor within the housing fixed to the driven shaft, the driving rotor and the driven rotor being opposed to each other, control means including a member movable axially independent of the rotors relatively to which both rotors rotate cooperating with each rotor to form annular channels, means for conducting hydraulic fluid from the interior of the housing to the channel of the driving rotor, delivery means relatively to which both rotors rotate projecting into and largely closing the channels at one point along each thereof, the delivery means providing a passage for hydraulic fluid between the respective channels, said passage having portions respectively adapted to deliver hydraulic fluid to the channel of the driven rotor in such manner as to cause rotation of the driven rotor in its respective directions of rotation, valve means for controlling flow of hydraulic fluid to said portions, valve operating means connected with the valve means for operating the same and projecting through the housing for operation from without the housing, impelling means carried by the driving rotor adapted to project into and normally substantially fill in cross-section the channel thereof for impelling into said passage hydraulic fluid from the channel of the driving motor upon rotation of the driving rotor, reacting means carried by the driven motor adapted to project into and normally substantially fill in cross-section the channel thereof to be acted on by the hydraulic fluid delivered through said passage whereby the driven rotor is rotated, retracting means extending between the delivery means and the control means coacting with the impelling means and the reacting means respectively to cause cyclic retraction of the impelling means and the reacting means from their respective channels to enable them to pass the delivery means, the axially movable member being shiftable toward and away from the respective rotors to control the depths of the channels whereby to control the power-speed ratio of the transmission, a shifting device having a portion extending through the housing and adapted to be operated from without the housing, connections between the shifting device and the control means for shifting the control means axially movable member toward and away from the respective rotors upon operation of the shifting device and locking means operable from without the housing for locking the shifting device in fixed position.

18. A hydraulic transmission comprising a housing adapted to contain hydraulic fluid, a driving shaft entering the housing and adapted to be rotated by means outside the housing, a rotor within the housing fixed to the driving shaft, the driving shaft being hollow throughout a portion of its length and being adapted to receive hydraulic fluid from the interior of the housing at a point along the driving shaft removed from the rotor, a driven shaft entering the housing, a rotor within the housing fixed to the driven shaft, the driving rotor and the driven rotor being opposed to each other, control means including a member movable axially independent of the rotors relatively to which both rotors rotate cooperating with each rotor to form annular channels, the control means having a hydraulic fluid inlet communicating with the interior of the driving shaft through which hydraulic fluid is adapted to be conducted from the interior of the housing to the channel of the driving rotor, delivery means relatively to which both rotors rotate projecting into and largely closing the channels at one point along each thereof, the delivery means providing a passage for hydraulic fluid between the respective channels, said passage having portions respectively adapted to deliver hydraulic fluid to the channel of the driven rotor in such manner as to cause rotation of the driven rotor in its respective directions of rotation, valve means for controlling flow of hydraulic fluid to said portions, valve operating means connected with the valve means for operating the same and projecting through the housing for operation from without the housing, impelling means carried by the driving rotor adapted to project into and normally substantially fill in cross-section in the channel thereof for impelling into said passage hydraulic fluid conducted to the channel of the driving rotor through the inlet upon rotation of the driving rotor, reacting means carried by the driven rotor adapted to project into and normally substantially fill in cross-section the channel thereof to be acted on by the hydraulic fluid delivered through said passage whereby the driven rotor is rotated, retracting means extending between the delivery means and the control means coacting with the impelling means and the reacting means respectively to cause cyclic retraction of the impelling means and the reacting means from their respective channels to enable them to pass the delivery means, the axially movable member being shiftable toward and away from the respective rotors to control the depths of the channels whereby to control the power-speed ratio of the transmission, a shifting device having a portion extending through the housing and adapted to be operated from without the housing, connections between the shifting device and the control means for shifting the axially movable member toward and away from the respective rotors upon operation of the shifting device, locking means operable from without the housing for locking the shifting device in fixed position, the retracting means extending between the delivery means and the control means in all relative positions thereof, a discharge passage for the fluid extending from the driven rotor to the interior of the housing, the driven shaft having a hollow inner end portion receiving the inner end of the driving shaft, and a bearing mounted within the driven shaft in which the inner end of the driving shaft is journaled, the hollow inner end portion of the driven shaft having passage means therethrough and the hollow portion of the driving shaft having passage means therethrough communicating with said first mentioned passage means so that fluid from the interior of the housing passes through said first mentioned passage means and said second mentioned passage means to enter the hollow portion of the driving shaft.

KENNETH B. GLENN.

REFERENCES CITED

The following references are of record in the file of this patent:

UNITED STATES PATENTS

| Number | Name | Date |
|---|---|---|
| 997,204 | Morehouse | July 4, 1911 |
| 1,017,355 | White | Feb. 13, 1912 |
| 1,365,553 | Sheriff | Jan. 11, 1921 |
| 1,797,905 | Dooley | Mar. 24, 1931 |
| 1,830,156 | Zahn | Nov. 3, 1931 |
| 2,186,556 | Robbins | Jan. 9, 1940 |
| 2,355,780 | Byrne | Aug. 15, 1944 |
| 2,384,218 | Tucker | Sept. 4, 1945 |
| 2,393,479 | Segsworth | Jan. 22, 1946 |
| 2,417,218 | Segsworth | Mar. 11, 1947 |

FOREIGN PATENTS

| Number | Country | Date |
|---|---|---|
| 122,424 | Switzerland | Oct. 1, 1927 |
| 336,475 | Great Britain | Oct. 16, 1930 |
| 279,608 | Germany | Oct. 27, 1914 |
| 429,825 | Germany | June 3, 1926 |
| 459,448 | Germany | May 10, 1928 |
| 502,722 | Germany | July 17, 1930 |